C. G. OLSON.
WHEEL DRESSING DEVICE.
APPLICATION FILED OCT. 26, 1917.
1,266,707.
Patented May 21, 1918.
3 SHEETS—SHEET 1.
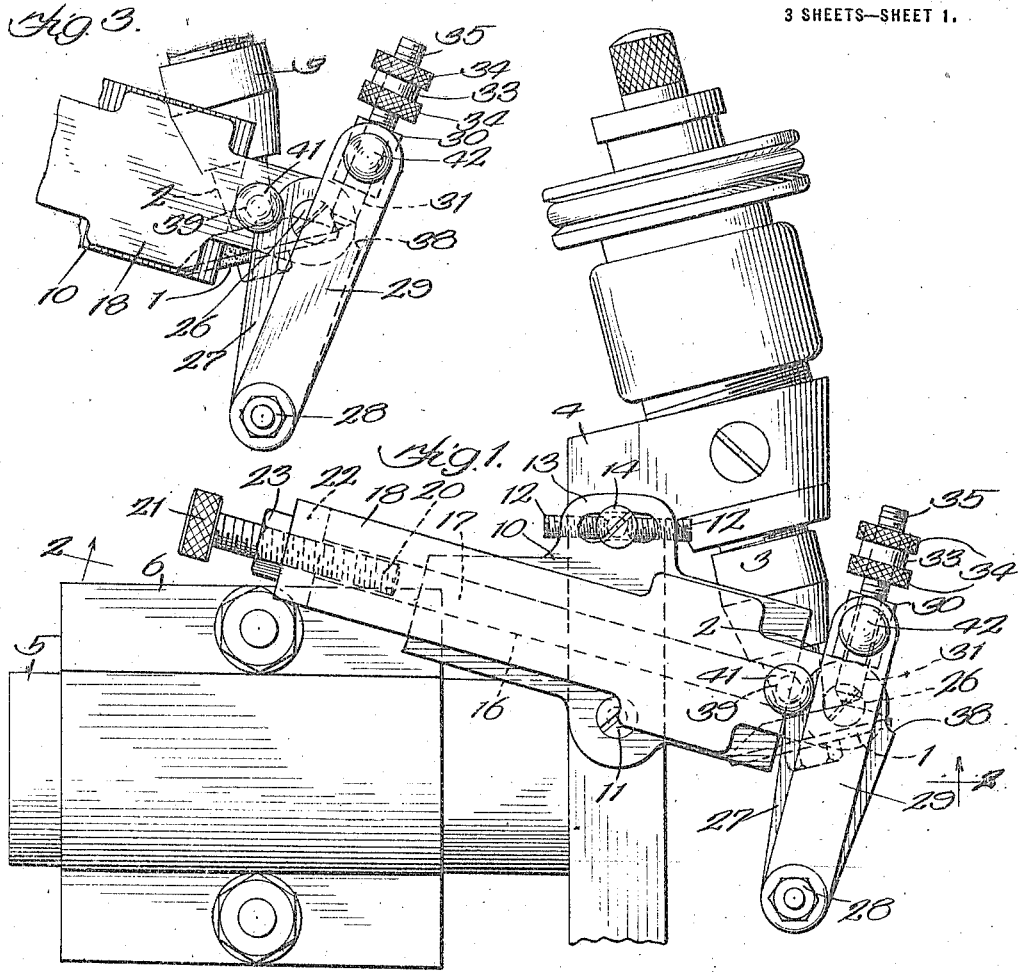
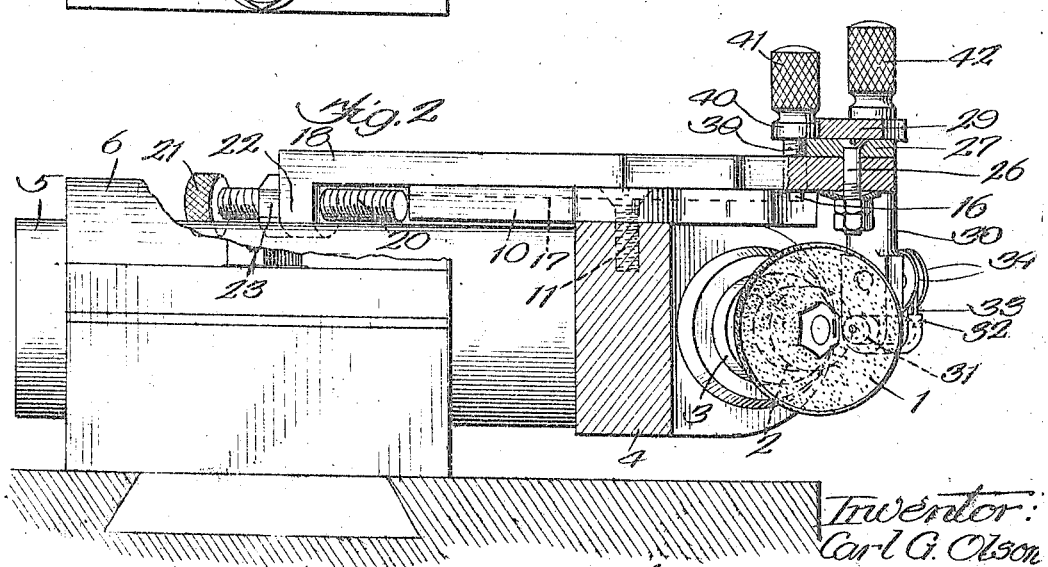
Inventor:
Carl G. Olson,
By Cheever & Cox Attys

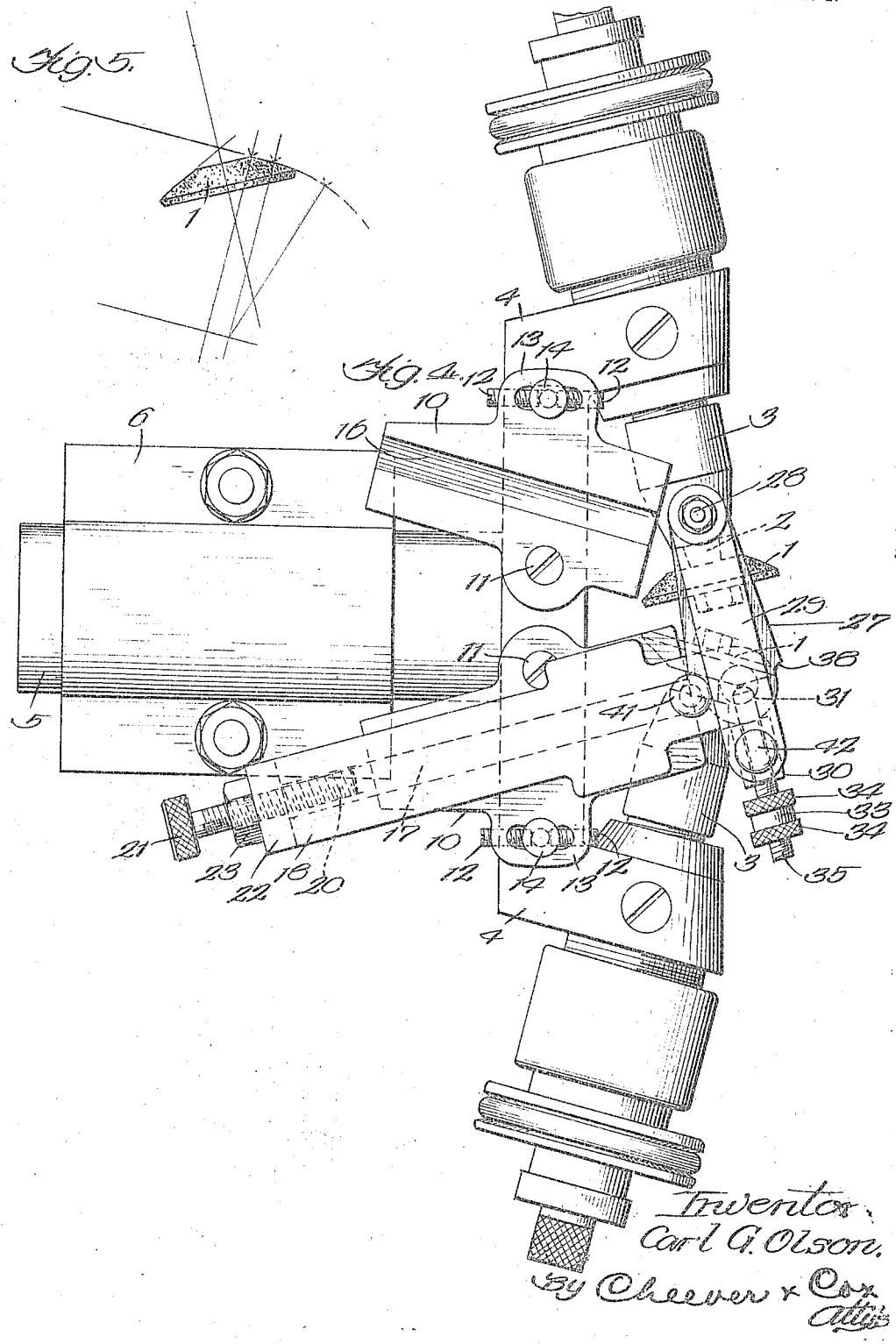

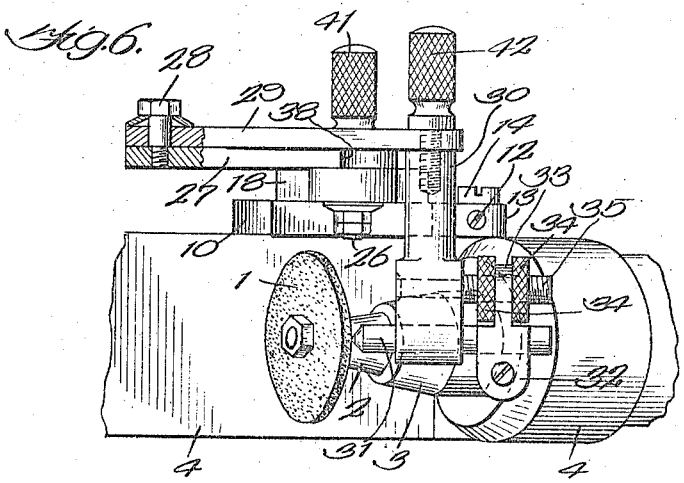
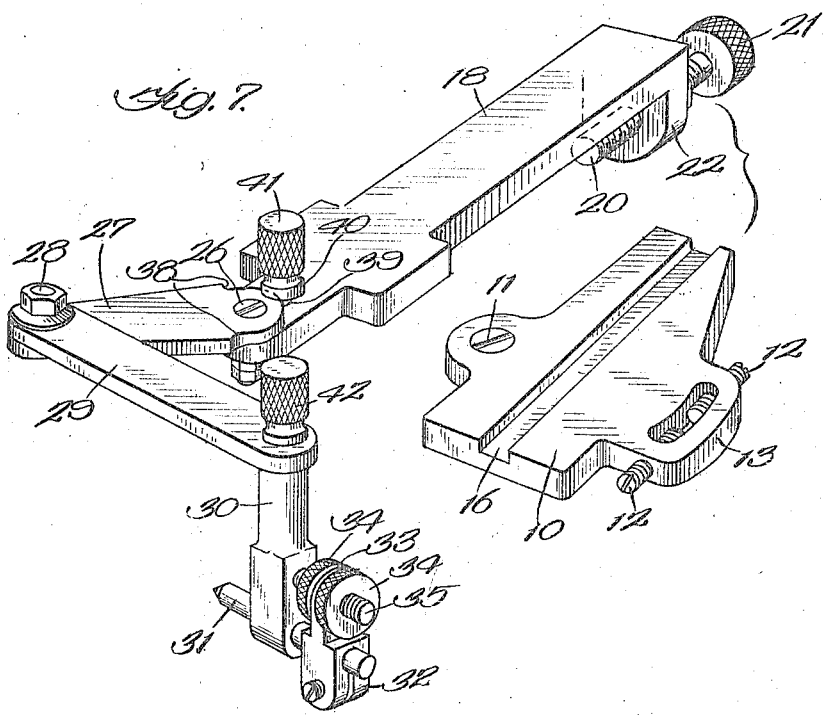

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

WHEEL-DRESSING DEVICE.

1,266,707.      Specification of Letters Patent.      Patented May 21, 1918.

Application filed October 26, 1917. Serial No. 198,562.

*To all whom it may concern:*

Be it known that I, CARL G. OLSON, a citizen of the United States, residing at Chicago, in the county of Cook and State of Illinois, have invented a certain new and useful Improvement in Wheel-Dressing Devices, of which the following is a specification.

My invention relates to tool-dressing devices or devices for truing or shaping tools such, for illustration, as grinding wheels. I have chosen to illustrate the invention in connection with a machine tool provided with grinding wheels for the protection of hobs. A machine of this character for producing hobs is shown in my copending application filed on the 26th day of October, 1917, Serial Number 198,563, Patent Number 1,259,770, dated March 19, 1918.

It will be understood that in hobs produced by hob grinding machines, the shape of the hob teeth will depend upon the shape of the grinding wheels. The grinding wheels must therefore be kept perfectly true, for any inaccuracy in the hob teeth would ultimately be transmitted to the gear wheels produced by the hob. In one type of gear wheel in common use today, the crowns of the teeth are rounded, whereas, the surface extending from a point near the pitch circle to a point near the root circle is straight. The specific object of my present invention in the embodiment shown in the drawings, is to provide means for truing or dressing grinding wheels to such shape that they will produce hobs which will, in turn, produce gear wheels configurated as above suggested. The wheels, of course, when in proper form, are conical at the portion lying near the axis of rotation and spherical or rounded at the portion nearer the periphery. Considered in its broadest aspect, the purpose of the invention is to provide means whereby tools may be dressed to a preordained form more or less automatically, the workman being relieved almost entirely of the need of exercising any judgment as to the shape of the wheel. In my above copending application, I have shown a hob grinder capable of grinding two sides of the hob teeth at once. The grinding wheels are similar but reversed in position. One of the objects of my present invention is to provide a tool-dressing device which may be attached to a machine such as shown in said copending application, and which shall be reversible so that a single tool-dressing device may be employed for the forming of both wheels. Contributory objects will hereinafter become apparent.

I accomplish my objects by the mechanism illustrated in the accompanying drawings, in which:

Figure 1 is a top plan of the complete dressing mechanism shown in position upon a hob grinding machine.

Fig. 2 is a vertical section on the line 2—2, Fig. 1.

Fig. 3 is a top plan detail showing a changed position of the slide and a changed position of the tool-carrying arm.

Fig. 4 is a top plan view similar to Fig. 1 but showing both sides of a double grinder and illustrating the manner in which the truing or dressing device may be reversed.

Fig. 5 is a detail showing a grinding wheel dressed to the configuration hereinabove described.

Fig. 6 is an elevation looking toward the left in Fig. 1.

Fig. 7 is a perspective view of the device itself dissociated from the hob grinding machine, the base being shown separated from the slide to better reveal the construction.

Similar numerals refer to similar parts throughout the several views.

To facilitate a complete understanding of the principle of the invention I will describe it in connection with a double grinding machine, the details of which are shown in the aforesaid copending application. It is sufficient for the present purpose to say that the grinding wheels 1 are mounted upon spindles 2 journaled in housings 3 which are supported at an oblique angle to the holder 4. The holder 4 has a shank 5 which is clamped or otherwise rigidly held in the tool post 6.

Now, turning to the parts more particularly concerned with my present invention: Two bases 10 are fastened to the top of the tool holder 4. The fastening means are so constructed as to permit angular adjustment of the bases and consist, according to the present design, of studs 11 which pass through the bases 10 and screw into the top of the tool holder. They constitute pivots for the bases. The bases are held in proper angular adjustment by set screws 12, 12 which screw in the slotted wings 13 of the bases and engage between them a post 14 which is suitably fastened to the holder 4. The bases each have longitudinal slots 16 for receiving the guide rib 17 formed on the under side of the slide 18. Only one slide is necessary and this is placed upon one or the other of the bases, depending upon which of the grinding tools is to be dressed. The travel of the slide in the general direction of the grinding wheels is limited by a stop 20, which in the present form consists of a set screw having a knurled head 21 and screwing in the lug 22, depending from the rear end of the slide, as best shown in Figs. 2 and 7. The inner end of the screw abuts the rear end of the base and thus limits the forward movement of the slide. A lock nut 23 holds the screw in the position to which it is adjusted.

At the forward end of the slide is a stud 26 which serves as a pivot for the reversing arm 27. At the free end of the reversing arm is a pin 28 which serves as a pivot for the second arm 29. At the free end of arm 29 is a hanger 30 which is horizontally apertured to receive the diamond-pointed dressing tool 31. Said tool is held in proper position in the hanger by a clamp 32 provided with an ear 33 interposed between two nuts 34. The nuts screw upon a threaded stud 35 which is rigidly fastened to the hanger, as best shown in Figs. 6 and 7. The rotary movement of the reversing arm 27 is limited by shoulders 38, formed upon it in position to engage a post 39 screwing into the top of slide 18. The post has an annular shoulder 40 overlying the edge of the circular portion of arm 27 and clamps the arm against rotation when screwed down tight. The post is provided with a knurled head 41 to facilitate manipulation. A head 42 is formed adjacent to the tool hanger 30 to facilitate manipulation of the tool.

The device operates as follows:

The reversing arm 27 is first brought to such position that one of its shoulders 38 will lie in close contact with post 39. The post is thereupon screwed down until its shoulder 40 clamps the reversing arm securely in position. Slide 18 is placed in retracted position away from the grinding wheel and the arm 29 is brought to a position in contact with the post 39, 40, 41. The parts are then in the position shown in Fig. 1 or Fig. 4. The slide 18 is then moved forward toward the grinding wheel until the point of the dressing tool 31 reaches the rotating grinding wheel, whereupon it will commence to dress the wheel. The operator now moves the slide gradually forward, producing a conical configuration on the grinding wheel until the stop screw 20 abuts the rear end of the base 10. The operator then rotates the arm 29 about its pivot 28, thus producing a rounded surface upon the grinding wheel. All that the operator has to do in order to produce a perfect configuration is to see to it that the arm 29 remains in contact with the post 39, 40, 41 until the slide has moved as far forward as it will go. It will be seen that said post, in addition to its stopping and clamping action for the reversing arm 27, also performs the function of a stop or gage for arm 29 and constitutes the starting point for the swinging movement of arm 29.

The remaining grinding wheel may be trued in a similar manner by lifting the slide out of one base 10 and placing it in the other, at the same time reversing the arm 27 so that the other one of its shoulders 38 shall be in contact with the post 39, 40, 41.

Having thus described my invention, what I claim as new and desire to secure by Letters Patent, is:

1. Mechanism for dressing the wheels of grinding machines, having a dressing tool, an arm carrying the dressing tool, a support whereto the arm is pivoted so as to swing the tool approximately in a plane passing through the axis of the grinding wheel, and when the parts are in acting position, the entire grinding wheel occupying a position between the point of the dressing tool and the pivotal axis, extended, of the arm whereon it is carried.

2. Mechanism for truing the wheels of grinding machines, having a dressing tool with an acting point at one end, an arm carrying the tool and pivoted so as to swing the tool approximately in a plane passing through the axis of the grinding wheel and the median line or axis of the dressing tool, a carrier whereto said arm is pivoted, said carrier being movable at an angle to the axis of the grinding wheel, and means for rotating the grinding wheel and holding it in a location between the point of the dressing tool and the axis, extended, of the arm on which the tool is carried.

3. Mechanism for dressing grinding wheels comprising a dressing tool, an arm on which it is mounted, and a support for said arm, the support being slidable at an angle to the axis of the grinding wheel, and the arm being pivoted to its support, and the point of the dressing tool being on the opposite side of the grinding wheel from the axis of the arm when the parts are in acting position.

4. A tool-dressing device having a rectilinearly movable member, a holder for the dressing tool, an arm whereon the holder is mounted, a second arm pivoted to the first mentioned arm and to the rectilinearly movable member, and means for clamping the second arm in different angular positions with respect to said rectilinearly movable element, whereby the device may be used for tool-dressing, either right handed or left handed.

5. A tool-dressing device having a base, a slide mounted thereon and guided in a straight line, a reversing arm pivoted to the slide, means for arresting said arm in either of two definite positions, a second arm pivoted to the reversing arm at a point remote from the axis of the latter, and a dressing tool carried at the free end of the second arm.

6. A tool-dressing device having a base, a slide mounted thereon and guided in a straight line, a reversing arm pivoted to the slide, means for arresting said arm in either of two definite positions, clamping means for holding the reversing arm in either of said two definite positions, whereby the device is reversible, a second arm pivoted at the free end of the reversing arm, and a dressing-tool holder at the free end of the second arm.

7. A tool-dressing device having a base, a slide movable thereon rectilinearly, a stop on said slide, a reversing arm pivoted to the slide and having two shoulders for engaging said stop to hold the arm in either of two definite positions, whereby the device is reversible, and a tool holder connected to said arm at a point remote from the axis thereof.

8. A tool-dressing device having a base, a slide movable thereon rectilinearly, a stop on said slide, a reversing arm pivoted to the slide and having two shoulders for engaging said stop to hold the arm in either of two definite positions, said stop screwing into the slide, and having a shoulder adapted to descend onto the arm to clamp it, and a dressing-tool holder carried by said arm.

9. A tool-dressing device having a base, a slide movable thereon rectilinearly, a stop on said slide, a reversing arm pivoted to the slide and having two shoulders for engaging said stop to hold the arm in either of two definite positions, said stop screwing into the slide and having a shoulder adapted to descend onto the arm to clamp it, a second arm pivoted to the free end of the reversing arm, and a dressing-tool holder carried at the free end of the second arm.

10. An attachment for machine tools designed to dress the tool in said machine, comprising a base designed to be supported upon and angularly adjustable with respect to the machine tool, a slide mounted upon said base, a stop for limiting the travel of said slide, a reversing arm pivoted to the slide, a second arm pivoted to the free end of the reversing arm, and a dressing-tool carried at the free end of the second arm.

11. A device for dressing rotating objects, comprising a slide, a reversing arm pivotally connected to said slide, a second arm pivoted to the reversing arm, and at its free end carrying the dressing tool, and a post constituting a stop for the reversing arm with reference to the slide, said post also constituting a stop for determining the initial position of the free end of the tool-carrying arm.

12. A device for dressing rotating objects, comprising a slide, a reversing arm pivoted to said slide, a clamp for fastening the arm relatively to the slide, a second arm pivoted at the outer end of the reversing arm and carrying the dressing tool at its free end, said clamp constituting a stop for determining the starting position of the tool-carrying arm relatively to the slide.

In witness whereof, I have hereunto subscribed my name.

CARL G. OLSON.